(No Model.)
W. C. COLWELL.
HOSE COUPLING.
No. 558,355. Patented Apr. 14, 1896.
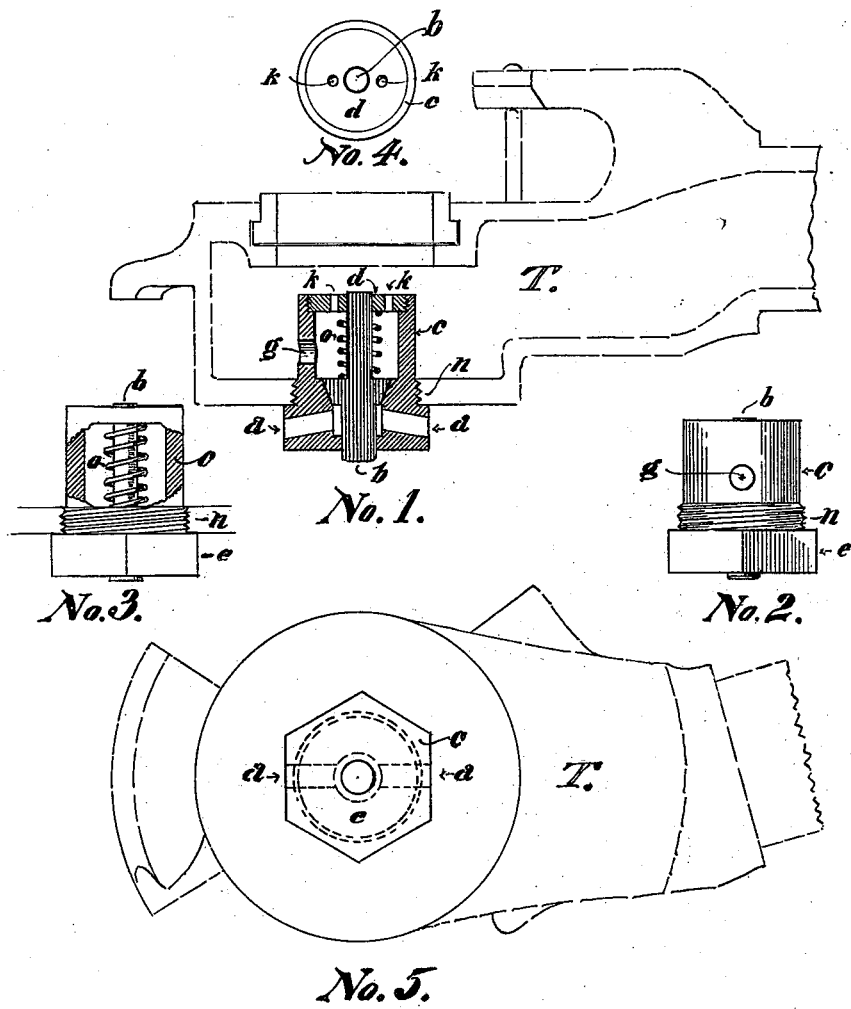
Witnesses.
E. Windish
A. G. Philips
William C. Colwell.
Inventor.
By John P. Marshall, Palatka, Fla.
Attorney.

UNITED STATES PATENT OFFICE.

WILLIAM C. COLWELL, OF PALATKA, FLORIDA.

HOSE-COUPLING.

SPECIFICATION forming part of Letters Patent No. 558,355, dated April 14, 1896.

Application filed June 8, 1895. Serial No. 552,191. (No model.)

*To all whom it may concern:*

Be it known that I, WILLIAM C. COLWELL, of Palatka, in the county of Putnam and State of Florida, have invented a new and useful Improvement in Hose-Couplings, of which the following is a specification.

When normal air-pressure is on the air-brake system in general use, it is difficult to disconnect or "break" the coupling of the flexible tubing or hose that connects the train-pipes of adjacent cars.

My invention consists in an air-pressure relief-valve applied to the coupling-heads of such tubing or hose by which the air-pressure may be lowered to a degree that will enable the coupling to be "broken" with ease.

The construction and operation of parts are as hereinafter described, and shown in the accompanying drawings, in which—

Figure 1 is a central section of the relief-valve applied to a hose-coupling head. Fig. 2 is a broken side view of the valve. Fig. 3 is a partial section of the same. Fig. 4 is a top plan view of the valve. Fig. 5 is a bottom plan view of the valve applied to a hose-coupling head.

To enable my invention to be understood, it is to be considered applied in the Westinghouse automatic air-brake system, in which an auxiliary air-reservoir, brake-cylinder, and train-pipe are arranged beneath each car, said train-pipe being provided with angle-cocks and flexible hose at each end of the car. These parts and their arrangement being well known, they are omitted from the drawings.

The half-coupling head T is in practice attached to the free end of such hose.

In the bottom or outer side of such coupling T is formed an opening whose edge is screw-threaded to provide for attachment of my relief-valve. The same has a cylindrical box or casing $c$, which is screw-threaded exteriorly at $n$ and provided with a hexagonal head $e$, to adapt it to be screwed into the aforesaid opening in the coupling-head T.

The valve proper, contained in said box or casing, is beveled and seats downward or outward on a beveled seat formed interiorly at a point opposite the exterior screw-thread $n$. The valve has two alined stems projecting in opposite directions. One stem, $d$, serves as a guide and works in an aperture formed in the inner removable end or head $d$ of the casing $c$ and is surrounded by a helical spring $o$, whose function is to hold the valve proper normally seated or closed when no air-pressure is on the same. The other and outer stem, $b$, is arranged in an axial bore or passage formed in the hexagonal head $e$ of the casing $c$ and projects beyond said head, as shown in Fig. 1. Lateral passages $a$ are formed in said head $e$, which communicate with the chamber of the valve. Air-openings $k$, formed in the inner head $d$ of the casing, and opening $g'$ in the side of the latter, also communicate with the valve-chamber.

From the foregoing it will be understood that if the valve be opened an air-passage is formed through its openings $k$, the chamber of the casing $c$, and the ports $a$. Suppose the hose-head T to be coupled with another of like form, and air-pressure applied throughout the brake system, as usual when a railway-train is made up, and it be desired to break or disconnect the coupling, the trainman first closes the angle-cocks of the train-pipe sections at adjacent ends of the coupled cars, and thus closes all communication between said sections. He then presses with his thumb on the outer projecting end of the valve-stem $b$, thus overcoming the tension of spring $o$ and the air-pressure on the valve, so that it is opened and escape of air permitted from the coupled hose, thus reducing the pressure to a degree sufficient to enable the couplings T to be easily detached from each other, thus greatly expediting the general uncoupling of adjacent cars. In such detachment the gaskets of the couplings are not injured by friction as when the full air-pressure is on.

The valve proper being kept normally seated, when the couplings T are disconnected dust and other foreign substances are excluded. In case dirt or dust enters the air-outlets $a$ the latter are cleaned by the discharge of air through them. In fact, the whole interior of the valve is thus kept clean.

It is manifest the valve is applicable to steam and water pipe couplings as well as to air-pipe couplings.

So far as I am aware I am the first to apply an air-pressure-relief valve to the coupling-head of the flexible-hose-connecting train-pipe sections. The same general purpose or object I have in view has, however, been attained by employing angle-cocks of such construction that they will relieve air-pressure in the hose, while cutting off communication between it and the train-pipe. (An example appears in Patent No. 312,155.) But the use of such expedients is attended by an undesirable result, namely: Since both the angle-cocks are manipulated separately, one is closed in advance of the other, and in so doing air escapes not only from the hose, but all that portion the train-pipe with which the hose still has free communication, and as a consequence of the reduction of pressure in the train-pipe the brakes are set with greater or less force on the car or cars which are cut off from others in front or rear or from the locomotive by such closing of the first angle-cock.

In the use of my invention no escape of air occurs save such as is contained in the hose itself, and hence the brakes are not set on the adjacent cars or others of which the train may be made up. The advantage of this is apparent.

What I claim is—

1. In a fluid-pressure system of the character indicated in which the train-pipe is provided with angle-cocks, a detachable hose or pipe-coupling proper having a valve which seats outward, and means for opening said valve against the air-pressure in the hose, and thereby relieving such pressure and permitting the coupling to be easily detached, as shown and described.

2. In a fluid-pressure system of the character indicated in which the train-pipe is provided with angle-cocks, the combination, with the detachable hose-coupling of a valve and ported valve-casing arranged in the side of the same, the said valve seating outward and having a stem projecting on the outer side of the coupling, whereby it is accessible for application of manual pressure, for the purpose of operating it to relieve pressure in the connecting-hose, as shown and described.

3. In the fluid-pressure system described in which the train-pipe is provided with angle-cocks the combination with the hose-coupling head having an opening in its side, a valve-casing secured in such opening, and having an air-passage through it, and a valve which seats outward in the casing and normally closes said air-passage, but is provided with a stem that projects exteriorly, being thus accessible for application of manual pressure, as shown and described.

In testimony whereof I affix my signature in presence of two witnesses.

WILLIAM C. COLWELL.

Witnesses:
 E. WINDISCH,
 A. G. PHILIPS.